(12) United States Patent
Miyake et al.

(10) Patent No.: US 10,816,357 B2
(45) Date of Patent: Oct. 27, 2020

(54) DISPLAY DEVICE, ELECTRONIC TIMEPIECE, DISPLAY METHOD, AND COMPUTER-READABLE RECORDING MEDIUM

(71) Applicant: CASIO COMPUTER CO., LTD., Tokyo (JP)

(72) Inventors: Takeshi Miyake, Tokyo (JP); Hayato Hori, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 332 days.

(21) Appl. No.: 15/905,906

(22) Filed: Feb. 27, 2018

(65) Prior Publication Data

US 2018/0266846 A1    Sep. 20, 2018

(30) Foreign Application Priority Data

Mar. 17, 2017    (JP) .................. 2017-052790

(51) Int. Cl.
| | |
|---|---|
| *G01C 22/00* | (2006.01) |
| *G08B 5/38* | (2006.01) |
| *G08B 21/24* | (2006.01) |
| *G04G 9/08* | (2006.01) |
| *G09G 5/12* | (2006.01) |
| *G09G 3/04* | (2006.01) |
| *G04R 20/02* | (2013.01) |
| *G04G 21/02* | (2010.01) |
| *G04G 21/00* | (2010.01) |

(52) U.S. Cl.
CPC ............. *G01C 22/006* (2013.01); *G04G 9/08* (2013.01); *G04G 21/00* (2013.01); *G04G 21/02* (2013.01); *G04R 20/02* (2013.01); *G08B 5/38* (2013.01); *G08B 21/24* (2013.01); *G09G 3/04* (2013.01); *G09G 5/12* (2013.01); *G09G 2330/026* (2013.01); *G09G 2330/027* (2013.01)

(58) Field of Classification Search
CPC ........ G01C 22/006; G08B 5/38; G08B 21/24; G04G 9/08; G04G 21/02; G04G 21/00; G09G 2330/027; G09G 5/12; G09G 3/04; G09G 2330/026; G04R 20/02
See application file for complete search history.

(56) References Cited

U.S. PATENT DOCUMENTS

| | | | | |
|---|---|---|---|---|
| 5,640,786 | A * | 6/1997 | Buyayez | .................. A43B 3/00 36/114 |
| 2008/0223198 | A1* | 9/2008 | Sasaki | .................. G10H 1/0041 84/602 |
| 2009/0240461 | A1* | 9/2009 | Makino | ................ A61B 5/1123 702/141 |
| 2009/0271147 | A1 | 10/2009 | Sugai | |

(Continued)

FOREIGN PATENT DOCUMENTS

| | | |
|---|---|---|
| JP | 2006-243934 A | 9/2006 |
| JP | 2010-167262 A | 8/2010 |

*Primary Examiner* — Mischita L Henson
(74) *Attorney, Agent, or Firm* — Scully Scott Murphy & Presser

(57) ABSTRACT

A display device includes a display having a first area and a second area, a counter configured to count a number of steps of a user during walking, and a processor configured to alternately turn on display of the first area and display of the second area in a case where the number of steps of the user during walking is being counted by the counter.

14 Claims, 4 Drawing Sheets

(56) References Cited

U.S. PATENT DOCUMENTS

| | | | |
|---|---|---|---|
| 2013/0058197 A1* | 3/2013 | Yonekura | G04G 19/12 368/10 |
| 2014/0200691 A1 | 7/2014 | Lee et al. | |
| 2016/0158602 A1 | 6/2016 | Lee et al. | |

* cited by examiner

DISPLAY DEVICE, ELECTRONIC TIMEPIECE, DISPLAY METHOD, AND COMPUTER-READABLE RECORDING MEDIUM

CROSS-REFERENCE TO RELATED APPLICATION

This application is based upon and claims the benefit of priority from the prior Japanese Patent Application No. 2017-052790, filed on Mar. 17, 2017, the entire contents of which are incorporated herein by reference.

BACKGROUND

The present disclosure relates to a display device, an electronic timepiece, a display method, and a computer-readable recording medium.

In the related art, a technology for displaying the number of steps if walking stops in the course of measuring the number of steps is known (for example, Japanese Patent Application Laid-Open No. 2009-266071).

However, in the technology of the related art, the user can determine whether an acceleration sensor is operating and steps are being counted, only on the basis of whether display of the number of steps is increasing.

SUMMARY

In order to solve the above-mentioned problem, a display device of a preferred embodiment includes a display configured to have a first area and a second area, a counter configured to count a number of steps of a user during walking, and a processor configured to alternately turn on display of the first area and display of the second area in a case where the number of steps of a user during walking are being counted by the counter.

DETAILED DESCRIPTION OF THE EMBODIMENTS

Hereinafter, embodiments will be described in detail with reference to the accompanying drawings. Although the embodiments will be described taking electronic timepieces as examples, the present disclosure is not limited thereto.

[Configuration of Electronic Timepiece 1]

Figure 1:
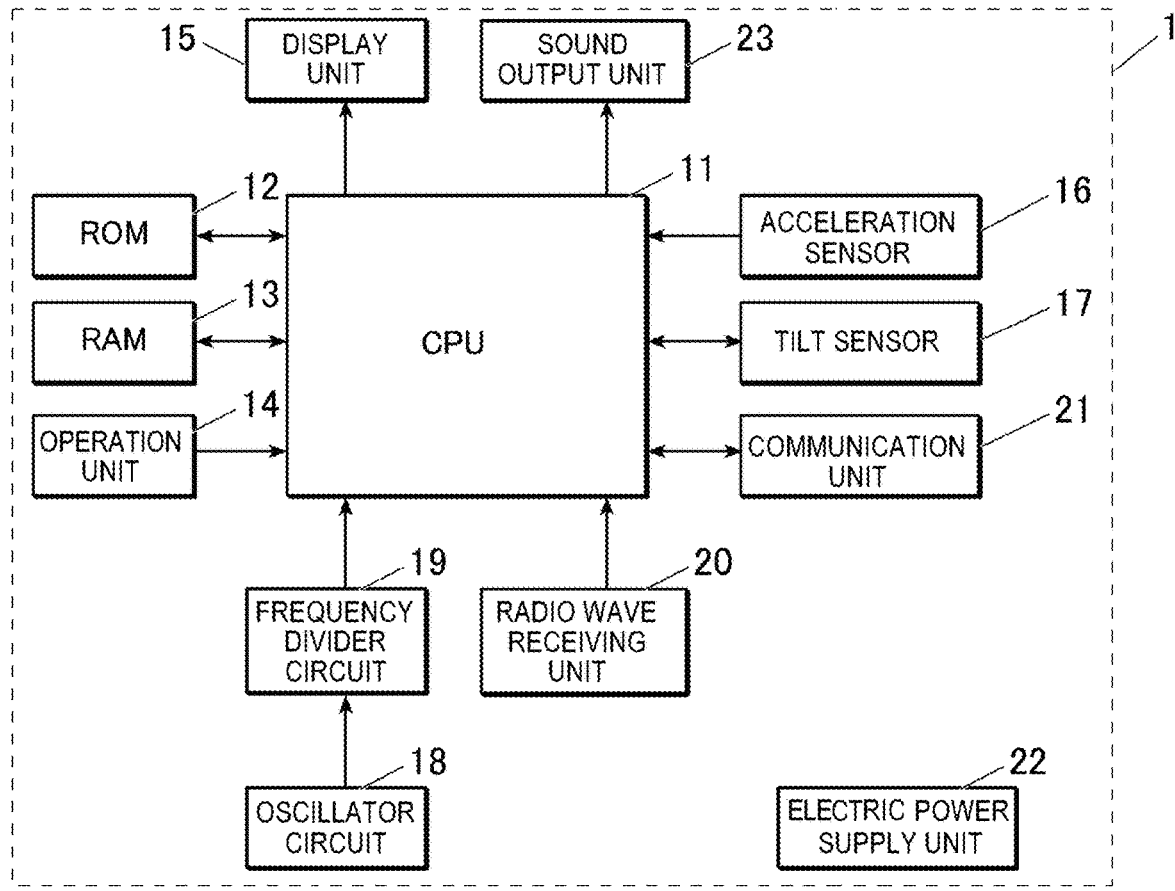
FIG. 1 is a block diagram illustrating functional components of an electronic timepiece of an embodiment.

FIG. 1 is a block diagram illustrating functional components of an electronic timepiece 1 according to a first embodiment.

The electronic timepiece 1 is a timepiece having a function of counting steps when a user is walking and displaying the count. The present embodiment will be described taking the case where the electronic timepiece 1 is a watch as an example; however, the electronic timepiece is not limited thereto.

The electronic timepiece 1 is configured to have a central processing unit (CPU) 11, a read only memory (ROM) 12, a random access memory (RAM) 13, an operation unit 14, a display unit 15, an acceleration sensor 16, a tilt sensor 17, an oscillator circuit 18, a frequency divider circuit 19, a radio wave receiving unit 20, a communication unit 21, a electric power supply unit 22, a sound output unit 23, and so on.

The CPU 11 is a processor configured to execute various programs stored in the ROM 12, thereby performing a variety of calculation and controlling the individual units. For example, the CPU 11 determines whether a user is walking, on the basis of an output from the acceleration sensor 16, and if determining that the user is walking, the CPU adds 1 to a counter of the RAM 13, thereby counting steps. In other words, the CPU 11 functions as a counter in cooperation with the acceleration sensor 16. Also, the CPU 11 functions as a processor by performing a pedometer control process (see FIG. 4) in cooperation with programs stored in the ROM 12. In the following description, the function of a step counting means will be referred to as the step counting function.

The ROM 12 is configured to store programs for making the CPU 11 perform control operations, data necessary to execute the programs, and so on. The ROM 12 may include a non-volatile memory such as a flash memory in which it is possible to rewrite or update data, in addition to or in place of a mask ROM.

The RAM 13 provides a memory space for work to the CPU 11, and is for temporarily storing data. For example, the RAM 13 includes a counter for counting steps when the user is walking, a buffer for counting steps when whether the user is walking is determined, and so on (all of which are not shown in the drawings).

The operation unit 14 receives input operations such as user's operations from the outside. The operation unit 14 has, for example, one or more push button switches, and outputs signals according to operations of pushing the push button switches to the CPU 11.

The display unit 15 is configured with a liquid crystal display (LCD) and the like, and performs display of the current time, display of the operation state of the step counting function, and so on according to display control signals from the CPU 11.

Figure 2:
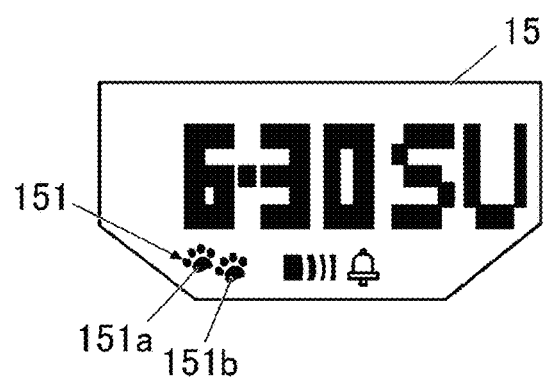
FIG. 2 is a view illustrating a step indicator displayed on a display unit.

In the present embodiment, the display unit 15 has an area for displaying a step indicator 151 to show the operation state of the step counting function when the power of the electronic timepiece 1 is in an ON state. As shown in FIG. 2, the step indicator 151 is composed of, for example, two footprint designs for visualizing walking, and the display unit 15 has a first area 151a and a second area 151b for displaying those two footprints. Display of the first area 151a and display of the second area 151b are turned on, flashed, or turned off to display that the step counting function is in a sleep state, in a stopped state, in a step counting state, or in an active-waking state.

Figure 3A:
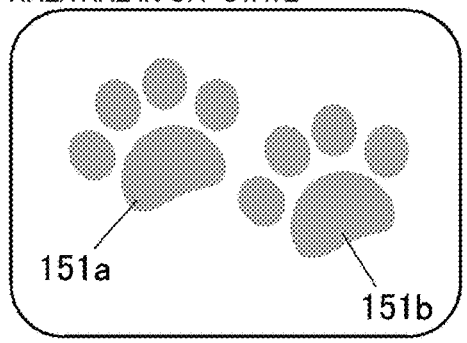
FIG. 3A is a view illustrating display of the step indicator when a step counting function is in a sleep state.
Figure 3B:
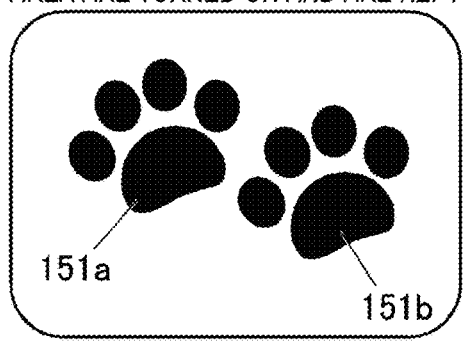
FIG. 3B is a view illustrating display of the step indicator when the step counting function is in a stopped state.
Figure 3C:
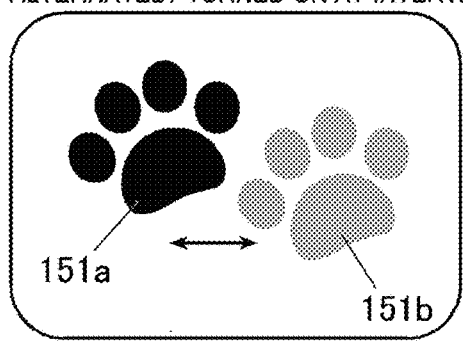
FIG. 3C is a view illustrating display of the step indicator when the step counting function is in a step counting state.
Figure 3D:
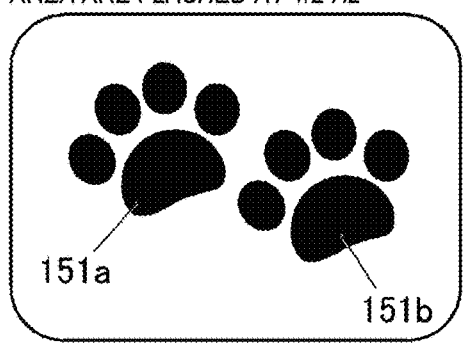
FIG. 3D is a view illustrating display of the step indicator when the step counting function is in an active-waking state.

For example, as shown in FIG. 3A, the case where both of display of the first area 151a and display of the second area 151b are in an OFF state shows that the step counting function is in the sleep state (the acceleration sensor 16 is in an OFF state). As shown in FIG. 3B, the case where both of display of the first area 151*a* and display of the second area 151*b* are in an ON state shows that the step counting function is in the stopped state (the acceleration sensor 16 is in an ON state but steps are not being counted). As shown in FIG. 3C, the case where display of the first area 151*a* and display of the second area 151*b* are alternately turned on shows that the step counting function is in the step counting state. As shown in FIG. 3D, the case where display of the first area 151*a* and display of the second area 151*b* are flashed at the same time shows that the step counting function is in the active-waking state (the state where the electronic timepiece is waking the user to walk).

The acceleration sensor 16 is, for example, a triaxial acceleration sensor, and detects acceleration according to walking and the like, and outputs a voltage proportional to the acceleration to the CPU 11.

In the case where axes of the electronic timepiece 1 in a left-right direction and an upward and downward direction as the electronic timepiece is seen from the front are referred to as an x axis and a y axis, respectively, and an axis perpendicular to the x axis and the y axis is referred to as a z axis, if the electronic timepiece 1 is tilted on the x axis in a predetermined direction (for example, in the direction of 12 o'clock of the timepiece), the tilt sensor 17 outputs an ON signal to the CPU 11; whereas if the electronic timepiece is tilted in the opposite direction to the predetermined direction (for example, in the direction of 6 o'clock of the timepiece), the tilt sensor outputs an OFF signal to the CPU.

Because of the movable range of an arm, if the electronic timepiece 1 is worn on an arm, since the electronic timepiece 1 is tilted as the arm moves, switching of the output of the tilt sensor 17 between the ON state and the OFF state becomes easy. Therefore, by detecting switching of the output of the tilt sensor 17 from the ON state to the OFF state or from the OFF state to the ON state, it is possible to detect that the user is wearing the electronic timepiece 1 on an arm.

The oscillator circuit 18 generates a signal having a predetermined frequency, for example, on the basis of oscillation of a crystal oscillator, and outputs the generated signal to the frequency divider circuit 19.

The frequency divider circuit 19 divides the frequency signal input from the oscillator circuit 18 at a set frequency division ratio, thereby generating a frequency division signal, and outputs the frequency division signal. The frequency division ratio option can be changed by the CPU 11. The CPU 11 can measure the current date and time and a time by counting frequency division signals having a predetermined frequency and input from the frequency divider circuit 19.

The radio wave receiving unit 20 performs a receiving operation of receiving transmission radio waves from positioning satellites of a satellite positioning system of the United States called GPS (Global Positioning System) and processing the transmission radio waves, thereby acquiring date-and-time information (time information and date information) and current location information, and converts information requested by the CPU 11 into a predetermined format, and outputs the corresponding information to the CPU 11.

The communication unit 21 performs various operations for performing near field communication (wireless communication), here, communication using Bluetooth (registered as a trade mark) (mainly a low-electric power-consumption version such as version 4.0) with an external electronic device (an external device), under control of the CPU 11.

The electric power supply unit 22 supplies electric power necessary for operations of each unit of the electronic timepiece 1, to the corresponding unit. The electric power supply unit 22 supplies electric power output from a battery (not shown in the drawings) as operation voltage for each unit. As the battery, a solar panel for performing electric power generation based on incident light, a secondary battery for storing the generated electric power, and so on may be provided, or a dry battery, a rechargeable battery, or the like may be provided so as to be removable.

The sound output unit 23 outputs notification sounds and voices under control of the CPU 11.

[Operation of Electronic Timepiece 1]

Now, an operation of controlling display of the state of a step counting operation of the electronic timepiece 1 will be described.

Figure 4:
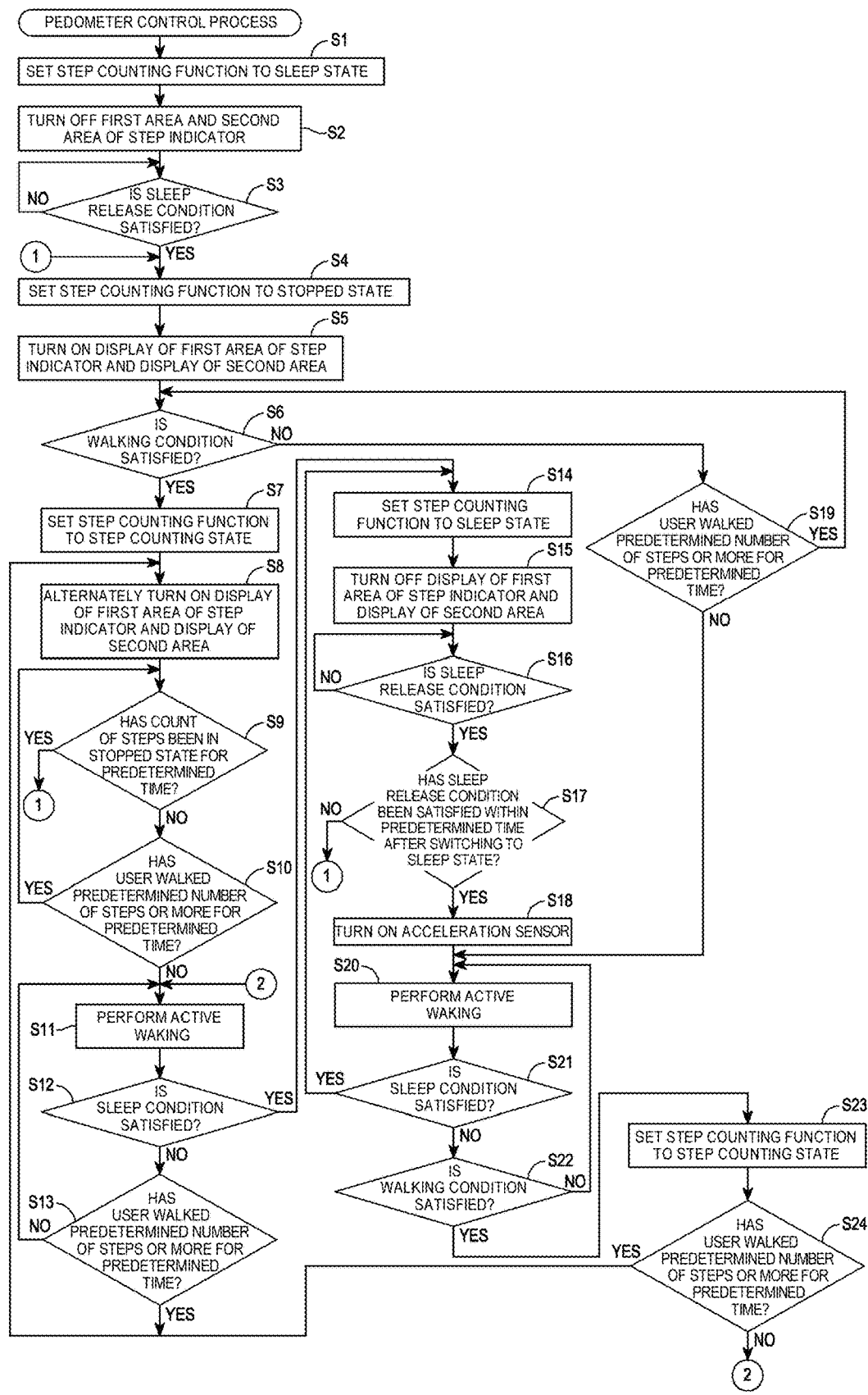
FIG. 4 is a flow chart illustrating a pedometer control process which is performed by a CPU of FIG. 1.

FIG. 4 is a flow chart illustrating the pedometer control process which is performed by cooperation of the CPU 11 and the programs stored in the ROM 12. If the power of the electronic timepiece 1 is turned on, the pedometer control process starts to be performed. Hereinafter, the pedometer control process will be described with reference to FIG. 4.

First, in STEP S1, the CPU 11 sets the step counting function to the sleep state. In other words, the CPU 11 stops supply of electric power from the electric power supply unit 22 to the acceleration sensor 16, thereby turning off the acceleration sensor 16.

Also, in STEP S2, the CPU 11 turns off both of display of the first area 151*a* of the step indicator 151 of the display unit 15 and display of the second area 151*b* (see FIG. 3A), Subsequently, in STEP S3, the CPU 11 waits for a sleep release condition to be satisfied. For example, if the input from the tilt sensor 17 to the CPU 11 is switched from the ON state to the OFF state or from the OFF state to the ON state (in other words, a tilt of the electronic timepiece 1 is detected), or if the CPU receives an input from the operation unit 14, the CPU determines that the sleep release condition of the step counting function is satisfied.

In the case of determining that the sleep release condition is satisfied ("YES" in STEP S3), in STEP S4, the CPU 11 sets the step counting function to the stopped state. In other words, the CPU 11 supplies electric power from the electric power supply unit 22 to the acceleration sensor 16, thereby turning on the acceleration sensor 16, and if receiving an output from the acceleration sensor 16, the CPU determines whether a walking condition is satisfied, on the basis of the output. The count of steps during determination on walking is stored in the buffer, and if the walking condition is satisfied, the count is added to the counter.

Also, in STEP S5, the CPU 11 turns on both of display of the first area 151*a* of the step indicator 151 of the display unit 15 and display of the second area 151*b* and keeps them in the ON state (see FIG. 3B).

Subsequently, in STEP S6, the CPU 11 determines whether the walking condition is satisfied, on the basis of the output from the acceleration sensor 16. For example, if a predetermined number of steps or more are counted with a steady rhythm within a predetermined number of seconds (for example, one or more steps are counted for 1 second, and five or more steps are counted for 5 seconds), the CPU 11 determines that the walking condition is satisfied, on the basis of the output from the acceleration sensor 16.

In the case of determining that the walking condition is satisfied ("YES" in STEP S6), in STEP S7, the CPU 11 sets the step counting function to the step counting state. In other words, the CPU 11 counts steps detected on the basis of the output from the acceleration sensor 16, as the number of steps during walking.

Also, in STEP S8, the CPU 11 alternately turns on display of the first area 151a of the step indicator 151 of the display unit 15 and display of the second area 151b thereof, for example, at intervals of one seconds (see FIG. 3C).

Subsequently, in STEP S9, the CPU 11 determines whether the count of steps has been in the stopped state for a predetermined time (for example, 2.5 seconds).

In the case of determining that the count of steps has been in the stopped state for the predetermined time ("YES" in STEP S9), the CPU 11 returns to STEP S4, and sets the step counting function to the stopped state.

In the case of determining that the count of steps has not been in the stopped state for the predetermined time ("NO" in STEP S9), in STEP S10, the CPU 11 determines whether the user has walked a predetermined number of steps or more for a predetermined time. For example, the CPU determines whether 300 or more steps have been counted for one hour.

In the case of determining that the user has walked the predetermined number of steps or more for the predetermined time ("YES" in STEP S10), the CPU 11 returns to STEP S9. In the case of determining that the user has not walked the predetermined number of steps or more for the predetermined time ("NO" in STEP S10), the CPU 11 proceeds to STEP S11.

In STEP S11, the CPU 11 performs active-waking. Active-waking means displaying display information for waking the user to walk or outputting a notification sound for urging the user to walk if the user has not walked the predetermined number of steps or more for the predetermined time (for example, 300 or more steps for one hour).

Figure 5:
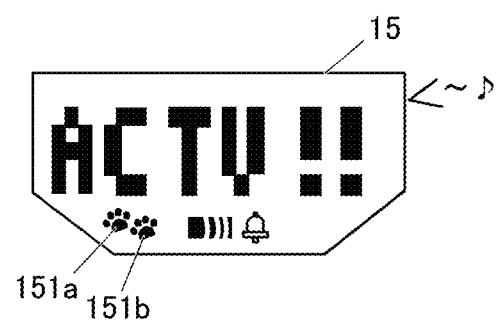
FIG. 5 is a view illustrating an example of active-waking.

In STEP S11, for example, the CPU 11 performs display for waking the user to walk, like display of a character string "ACTV!!", on the display unit 15, as shown in FIG. 5 while outputting a predetermined notification sound for urging the user to walk, for a predetermined time (for example, one second) by the sound output unit 23. Also, the CPU 11 flashes display of the first area 151a of the step indicator 151 of the display unit 15 and display of the second area 151b at the same time (see FIG. 3D). At this time, the CPU flashes display of the first area 151a and display of the second area 151b at the same time at intervals shorter than those when it alternately turns on display of the first area 151a and display of the second area 151b to show the step counting state. Therefore, in the case where the user has not walked the predetermined number of steps or more for the predetermined time (for example, 300 or more steps for one hour), it is possible to urge the user to walk.

Subsequently, in STEP S12, the CPU 11 determines whether a sleep condition is satisfied. Here, the sleep condition means a condition for switching the step counting function to the sleep state, and in the present embodiment, a condition representing that the user is not using the electronic timepiece 1 is used. For example, in the case where the CPU has not received any output from the acceleration sensor 16, and any tilt has not been detected by the tilt sensor 17, and the CPU has not received any input from the operation unit 14, for a predetermined time (for example, for two or three minutes), the CPU 11 determines that the sleep condition is satisfied.

In the case of determining that the sleep condition is not satisfied ("NO" in STEP S12), in STEP S13, the CPU 11 determines whether the user has walked a predetermined number of steps or more for a predetermined time. For example, the CPU determines whether 300 or more steps have been counted for one hour.

In the case of determining that the user has not walked the predetermined number of steps or more for the predetermined time ("NO" in STEP S13), the CPU 11 returns to STEP S11, and performs active-waking again.

In the case of determining that the user has walked the predetermined number of steps or more for the predetermined time ("YES" in STEP S13), the CPU 11 returns to STEP S8.

Meanwhile, in the case where it is determined in STEP S12 that the sleep condition is satisfied ("YES" in STEP S12), the CPU 11 sets the step counting function to the sleep state in STEP S14, and turns off both of display of the first area 151a of the step indicator 151 of the display unit 15 and display of the second area 151b in STEP S15. The process of STEP S14 is identical to the process of STEP S1, and thus the description of STEP S1 can be referred to.

Subsequently, in STEP S16, the CPU 11 waits for a sleep release condition to be satisfied. This sleep condition is identical to that described with respect to STEP S3, and thus the description of STEP S3 can be referred to.

In the case where the sleep release condition is satisfied ("YES" in STEP S16), in STEP S17, the CPU 11 determines whether the sleep release condition has been satisfied within a predetermined time (for example, within one hour) after switching to the sleep state.

In the case of determining that the sleep release condition has been satisfied after the predetermined time from switching to the sleep state ("NO" in STEP S17), the CPU 11 returns to STEP S4, and sets the step counting function to the stopped state.

In the case of determining that the sleep release condition has been satisfied within the predetermined time) after switching to the sleep state ("YES" in STEP S17), the CPU 11 supplies electric power from the electric power supply unit 22 to the acceleration sensor 16, thereby turning on the acceleration sensor 16, in STEP S18, and proceeds to STEP S20.

Also, if it is determined that the walking condition is not satisfied ("NO" in STEP S6) when the step counting function is in the stopped state, and then it is determined that the user has not walked the predetermined number of steps or more for the predetermined time ("NO" in STEP S19), the CPU proceeds to STEP S20.

In STEP S20, the CPU 11 performs active-waking. This active-waking is identical to that described with respect to STEP S11, and thus the description of STEP S11 can be referred to.

In the case where the sleep state has been released within a predetermined time after switching to the sleep state, the CPU performs the active-waking without switching the step counting function to the stopped state. Therefore, it is possible to frequently urge the user to walk.

Subsequently, in STEP S21, the CPU 11 determines whether the sleep condition is satisfied. In the case of determining that the sleep condition is satisfied ("YES" in STEP S21), the CPU 11 returns to STEP S14.

In the case of determining that the sleep condition is not satisfied ("NO" in STEP S21), in STEP S22, the CPU 11 determines whether the walking condition is satisfied. In the case of determining that the walking condition is not satisfied ("NO" in STEP S22), the CPU returns to STEP S20.

In the case of determining that the walking condition is satisfied ("YES" in STEP S22), in STEP S23, the CPU 11 sets the step counting function to the step counting state. In other words, the CPU 11 counts steps detected on the basis of the output from the acceleration sensor 16, as the number of steps during walking. Then, the CPU proceeds to STEP S24.

In STEP S24, the CPU 11 determines whether the user has walked the predetermined number of steps or more for the predetermined time. In the case of determining that the user has not walked the predetermined number of steps or more for the predetermined time ("NO" in STEP S24), the CPU 11 proceeds to STEP S11, and performs active-waking. In the case of determining that the user has walked the predetermined number of steps or more for the predetermined time ("YES" in STEP S24), the CPU 11 proceeds to STEP S8, and alternately turns on display of the first area 151a of the step indicator 151 and display of the second area 151b.

While the power of the electronic timepiece 1 is in the ON state, the CPU 11 performs the above-described pedometer control process, thereby controlling supply of electric power to the acceleration sensor 16 and display of the step indicator 151 of the display unit 15.

As described above, according to the electronic timepiece 1, in the case where steps of the user during walking are being counted by the step counting function, the CPU 11 alternately turns on display of the first area 151a of the display unit 15 and display of the second area 151b.

Therefore, in the case where steps of the user during walking are being counted by the step counting function, display for visualizing walking is performed, specifically, display of the first area 151a and display of the second area 151b are alternately turned on, whereby the user can easily and intuitively grasp that steps are being counted. Further, since one of display of the first area 151a and display of the second area 151b is instantaneously in the ON state, the user can instantly check whether steps are being counted.

Also, as long as the user can intuitively grasp whether steps are being counted, display of the first area 151a and display of the second area 151b may be alternately turns on such that immediately before display of one area is turned off, display of the other area is turned on, or immediately before display of one area is turned on, display of the other area is turned off. For example, display of the first area 151a may be maintained in the ON state for one second, and immediately before display of the first area 151a is turned off, display of the second area 151b may be turned on. Also, after display of the first area 151a is maintained in the ON state for one second, if a very short time elapses, display of the second area 151b may be turned on. In the case where display of the first area and display of the second area are turned on in the above-described way, if watching the electronic timepiece 1, the user can intuitively grasp that display of the first area 151a and display of the second area 151b are alternately turned on, and thus can determine whether steps are being counted.

Also, in the case where steps of the user during walking are not being counted, the CPU 11 performs control to turn on or turn off both of display of the first area 151a and display of the second area 151b in the same pattern.

For example, in the case where steps of the user during walking are not being counted, both of display of the first area 151a and display of the second area 151b are turned on, or are turned off. For example, in the case where electric power is not being supplied to the acceleration sensor 16 for detecting the number of steps, the CPU 11 turns off both of display of the first area 151a and display of the second area 151b. Therefore, in the case where electric power is not being supplied to the acceleration sensor 16, display for visualizing that electric power is not being supplied to the acceleration sensor 16 is performed, specifically, both of display of the first area 151a and display of the second area 151b are turned off. Therefore, the user can intuitively grasp that electric power is not being supplied to the acceleration sensor 16.

Also, for example, in the case where electric power is being supplied to the acceleration sensor 16, but steps of the user during walking are not being counted, the CPU 11 turns off both of display of the first area 151a and display of the second area 151b. Therefore, the user can intuitively grasp that electric power is being supplied to the acceleration sensor 16 (the acceleration sensor is in the ON state) but the count of steps is in the stopped state.

Also, in the case where a predetermined condition representing that the user is not using the electronic timepiece 1 is satisfied, the CPU 11 stops supply of electric power from the electric power supply unit 22 to the acceleration sensor 16. For example, in the case where the CPU has not received any output from the acceleration sensor 16, and any tilt has not been detected by the tilt sensor 17, and the CPU has not received any input from the operation unit 14, for the predetermined time, the CPU determines that the predetermined condition representing that the user is not using the electronic timepiece 1 is satisfied, and stops supply of electric power from the electric power supply unit 22 to the acceleration sensor 16. Therefore, if the user is not using the electronic timepiece 1, supply of electric power to the acceleration sensor 16 is stopped immediately. Therefore, it is possible to suppress wasteful electric power consumption.

Also, if a tilt is detected by the tilt sensor 17 or the CPU receives an input from the operation unit 14 when supply of electric power to the acceleration sensor 16 is in the stopped state, the CPU 11 restarts supply of electric power to the acceleration sensor 16. Therefore, if the user wears the electronic timepiece 1 on an arm or operates the electronic timepiece, it is possible to automatically activate the acceleration sensor 16.

Also, in the case where the predetermined number of steps or more have not been counted for the predetermined time, the CPU 11 flashes display of the first area 151a and display of the second area 151b at the same time, thereby capable of urging the user to walk. Further, since the display information for waking the user to walk is displayed on the display unit 15, it is possible to directly wake the user to walk.

Also, when display of the first area 151a and display of the second area 151b are flashed at the same time to encourage the user to walk, if the predetermined condition representing that the user is not using the electronic timepiece 1 is satisfied, the CPU 11 stops supply of electric power to the acceleration sensor 16, thereby turning off both of display of the first area 151a and display of the second area 151b. Also, after supply of electric power to the acceleration sensor 16 stops, if a predetermined condition for releasing stop of supply of electric power to the acceleration sensor 16 is satisfied within a predetermined time, the CPU restarts supply of electric power to the acceleration sensor 16, and flashes display of the first area 151a and display of the second area 151b at the same time, thereby waking the user to walk.

Therefore, even though the acceleration sensor 16 is switched to the sleep state when the electronic timepiece urges the user to walk, if the user restarts to use the electronic timepiece 1 within the predetermined time, whereby the sleep state is released, it is possible to re-urge the user to walk.

Also, the description content of the embodiment is a preferred example of the electronic timepiece according to the present disclosure, and does not limit the present disclosure.

For example, in the above-described embodiment, the case where the electronic timepiece 1 has the display device according to the present disclosure has been described as an example; however, the present disclosure is not limited thereto. For example, the display device according to the present disclosure may be a display device of a pedometer, or may be installed in other electronic devices.

Also, in the above-described embodiment, the number of steps is detected on the basis of the output from the acceleration sensor 16. However, for example, the number of steps may be detected by other sensors such as a gyro sensor.

Also, in the above-described embodiment, display of the first area 151a of the step indicator 151 and display of the second area 151b are footprint designs. However, they may be other designs such as round designs.

Also, the first area 151a of the step indicator 151 may be an area for displaying hours of time information, and the second area 151b may be an area for displaying minutes and seconds of the time information, and the CPU 11 may turn on or off or flash display of hours of time information of the display unit 15 and display of minutes and seconds of the time information, according to the state of the step counting function. Therefore, even in the case where the display area of the display unit 15 is too small to provide an area for displaying the step indicator 151 in an area different from an area for displaying time information, the user can instantly check the state of the step counting function.

Moreover, the detailed configurations and detailed operations of the electronic timepiece can also be appropriately modified without departing from the scope of the present disclosure.

Although some embodiments of the present disclosure have been described, the scope of the present disclosure is not limited to the above described embodiments, and includes the scopes of inventions disclosed in claims and the scopes of their equivalents.

The invention claimed is:

1. A display device comprising:
a display having a first area and a second area; and
a processor configured to:
determine whether a user is walking based on an output from a sensor;
in response to determining that the user is walking, perform a step counting function to count a number of steps of the user based on the output from the sensor; and
in response to performing the step counting function, control the display to alternately turn on display within the first area of the display and display within the second area of the display.

2. The display device according to claim 1,
wherein the processor is configured to:
determine whether a first predetermined condition is satisfied;
in response to determining that the first predetermined condition is satisfied, not perform the step counting function; and
in response to not performing the step counting function, control the display to turn on or turn off both of display within the first area and display within the second area in a same pattern.

3. The display device according to claim 2,
wherein the sensor comprises an acceleration sensor, wherein the first predetermined condition is that electric power is being supplied to the acceleration sensor but the step counting function is not being performed, and
wherein the processor is configured to, in response to determining that the first predetermined condition is satisfied:
not perform the step counting function; and
control the display to turn on both of display within the first area and display within the second area in the same pattern.

4. The display device according to claim 2,
wherein the sensor comprises an acceleration sensor,
wherein the first predetermined condition is that electric power is not being supplied to the acceleration sensor, and
wherein the processor is configured to:
in response to determining that the first predetermined condition is satisfied, not perform the step counting function; and
in response to not performing the step counting function, control the display to turn off both of display within the first area and display within the second area in the same pattern.

5. The display device according to claim 4,
wherein a second predetermined condition is that the user is not using the display device, and
wherein the processor is configured to:
determine whether the second predetermined condition is satisfied; and
in response to determining that the second predetermined condition is satisfied, stop supply of electric power to the acceleration sensor.

6. The display device according to claim 5, further comprising:
a tilt sensor configured to detect a tilt; and
an operation input configured to receive an input operation,
wherein the processor is configured to:
determine whether an output has been received from the acceleration sensor, whether the tilt has been detected by the tilt sensor, and whether the input operation has been received by the operation input for a predetermined time; and
in response to determining that the output has not been received from the acceleration sensor, the tilt has not been detected by the tilt sensor, and the input operation has not been received by the operation input for the predetermined time, determine that the second predetermined condition is satisfied.

7. The display device according to claim 6,
wherein in a state where supply of electric power to the acceleration sensor is stopped, the processor is configured to, in response to the tilt sensor detecting the tilt or the operation input receiving the input operation, restart supply of electric power to the acceleration sensor.

8. The display device according to claim 4,
wherein a second predetermined condition is that a predetermined number of steps or more has been counted for a predetermined time, and
wherein the processor is configured to:
determine whether the second predetermined condition is satisfied; and
in response to determining that the second predetermined condition is satisfied, control the display to flash display within the first area and display within the second area at the same time.

9. The display device according to claim 8,
wherein a third predetermined condition is that the user is not using the display device, and
wherein the processor is configured to:
- in a state of controlling the display to flash display within the first area and display within the second area at the same time:
  - determine whether the third predetermined condition is satisfied; and
  - in response to determining that the third predetermined condition is satisfied:
    - stop supply of electric power to the acceleration sensor; and
    - control the display to turn off flash display within the first area and display within the second area;
- determine whether a fourth predetermined condition for releasing stop of supply of electric power to the acceleration sensor is satisfied within a predetermined time; and
- in response to determining that the third predetermined condition is satisfied:
  - restart supply of electric power to the acceleration sensor; and
  - control the display to re-flash display within the first area and display within the second area at the same time.

10. The display device according to claim 1,
wherein the display is configured to distributively display time information in the first area and the second area.

11. The display device according to claim 10,
wherein the display is configured to display hours of the time information in the first area of the display and to display minutes and seconds of the time information in the second area of the display, and
wherein the processor is configured to, in response to performing the step counting function, control the display to alternately turn on display of the hours of the time information in the first area of the display and display of the minutes and seconds of the time information in the second area of the display.

12. An electronic timepiece comprising the display device according to claim 1.

13. A display method of a display device including a display having a first area and a second area, the display method comprising:
- determining whether a user is walking based on an output from a sensor;
- in response to determining that the user is walking, performing a step counting function to count a number of steps of the user based on the output from the sensor; and
- in response to performing the step counting function, controlling the display to alternately turn on display within the first area of the display and display within the second area of the display.

14. A non-transitory computer-readable recording medium storing a program for controlling a display device including a display having a first area and a second area, the program causing the computer to at least perform:
- determining whether a user is walking based on an output from a sensor;
- in response to determining that the user is walking, performing a step counting function to count a number of steps of the user based on the output from the sensor; and
- in response to performing the step counting function, controlling the display to alternately turn on display within the first area of the display and display within the second area of the display.

* * * * *

UNITED STATES PATENT AND TRADEMARK OFFICE
CERTIFICATE OF CORRECTION

PATENT NO. : 10,816,357 B2  
APPLICATION NO. : 15/905906  
DATED : October 27, 2020  
INVENTOR(S) : Takeshi Miyake Page 1 of 1

It is certified that error appears in the above-identified patent and that said Letters Patent is hereby corrected as shown below:

On the Title Page

Column 2, References Cited, Foreign Patent Documents, should be added to the listing:  
JP     2015-531268    11/2015  
JP     2009-266071    11/2009

In the Claims

Column 11, Claim 9, Lines 16 and 17 should read:  
the first area and display within the second area;

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*